UNITED STATES PATENT OFFICE.

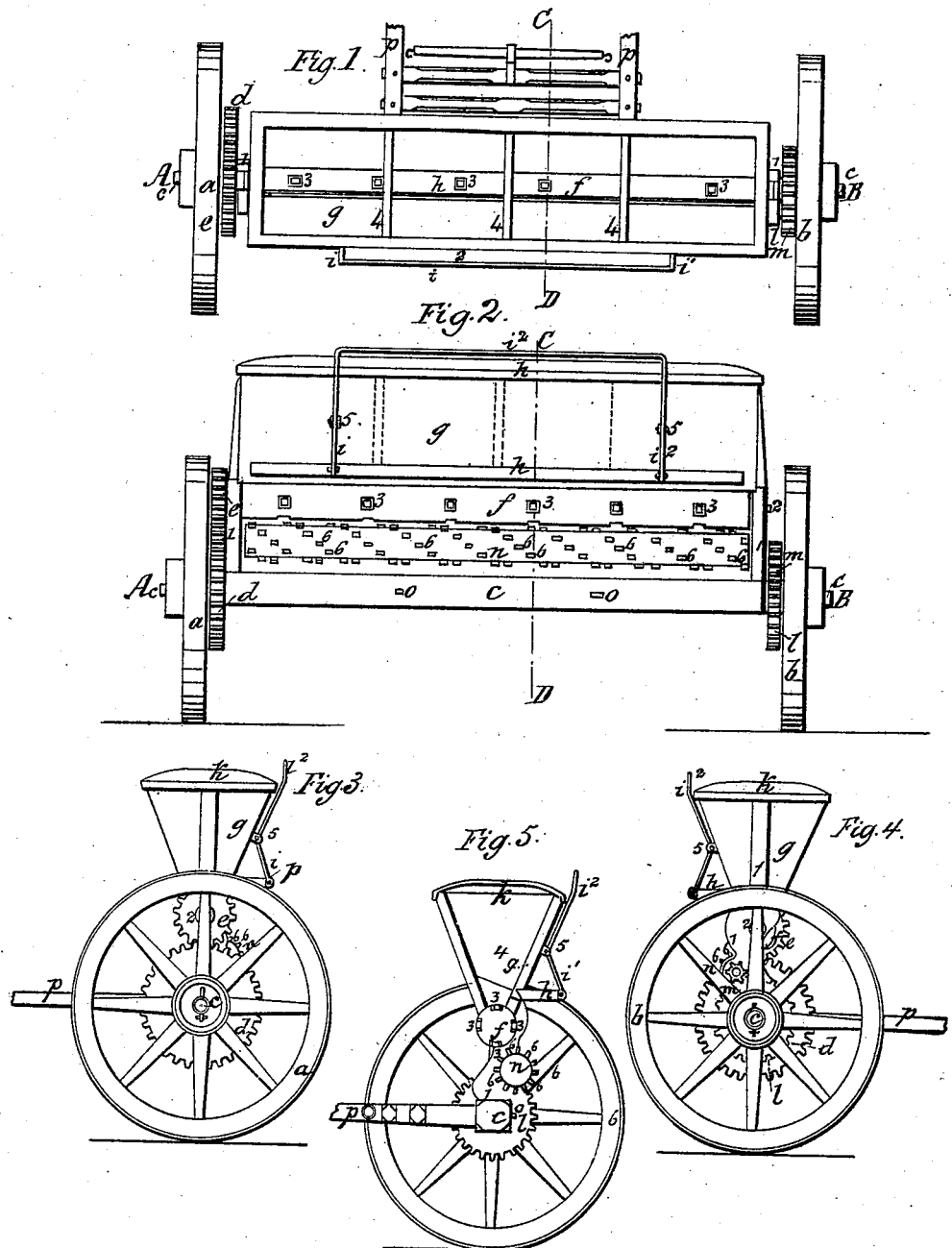

WM. J. JONES AND H. C. SMITH, OF FAIRFIELD, CONNECTICUT.

IMPROVEMENT IN MACHINES FOR SOWING GRAIN, &c., BROADCAST.

Specification forming part of Letters Patent No. 4,385, dated February 20, 1846.

*To all whom it may concern:*

Be it known that we, WILLIAM JAMES JONES and HENRY C. SMITH, of Fairfield, Fairfield county, State of Connecticut, agricultural-machine makers, have invented and made and applied to use certain new and useful improvements in the arrangement and combination of mechanical means for sowing grain and seed, or spreading manure of any kind, in the way technically termed "broadcast," the said improvement being intended to accomplish an even and equal distribution of the seed or grain sown or spread of the manure by the scattering operation of a roller set with pins or beaters upon the seed or grain or manure as it issues from receptacles in a second roller that receives it from a hopper or hoppers above, for which said improvements we seek Letters Patent of the United States; and we do hereby declare that the said improvements and the construction and use of the same are fully and substantially set forth and shown in the following description, and in the drawings annexed to and making part of this specification, wherein—

Figure 1 is a general plan. Fig. 2 is a back elevation. Fig. 3 is an elevation taken at the side A of Figs. 1 and 2. Fig. 4 is an elevation taken at the side B, Figs. 1 and 2; and Fig. 5 is a vertical cross-section as taken through the line C D, Figs. 1 and 2, and seen from the end A, and the other letters and numbers used as marks of reference apply to the like parts in all the several figures.

$a$ and $b$ are the main wheels, on which the machine moves when in use, fitted to work in any usual manner on the main axle-tree $c$, which near each wheel is fitted with a vertical standard, 1 1, that carries the working parts of the machine. The wheel $a$ is fitted with a toothed driving-wheel, $d$, fitted on the hub behind the spokes, which wheel $d$ gears into a pinion, $e$, on this end of the shaft of the feeder-roller $f$, which is mounted in bearings 2 2 in the standard 1 1. This roller $f$ has several mortises, 3 3 3, made in it of a size to contain a portion of grain or seed, or manure and fitted so as to hold small square or round boxes or cups, of wood or metal, tightly within them, by which the quantity of seed or grain or manure taken by each mortise may be reduced in any required proportion by making the boxes of increasingly thicker material for each decrease in the quantity to be sown, which is to be supplied into and from the long hopper $g$, the ends of which are supported in an upward but reduced prolongation of the standard 1 1, and the hopper itself is divided into four spaces by three partitions, 4 4 4. A long slide, $h$, passes in between the hopper $g$ and roller $f$, forming a valve fitted with a double lever, $i\ i'$, acting on fulcra 5 5 and uniting in a common handle, $i^2$, by which the valve $h$ is governed; and $k$ is a cover for the hopper. (Shown as removed in Fig. 1.)

On the inner part of the hub of the wheel $b$ is a large pinion, $l$, working into a small pinion, $m$, on this end of a shaft going through the standards 1 1, carrying between the standards the scattering-roller $n$. This is fitted with pins 6 6 6 6, having knobs or flattened surfaces to serve as beaters, at their outer ends or tops. A pair of staples, 0 0, on the axle-tree admit the fastening of a harrow to work with and be drawn behind the machine, and a pair of shafts, $p\ p$, admit of attaching animal-power to draw the machine over the ground to be sown.

The way to use this machine will be obviously that the hopper $g$ being filled and the slide $h$ withdrawn and the machine put in motion, every rotation of the wheel $a$ will, through the gear-wheels $d$ and $e$, cause a certain proportionate number of rotations of the feed-roller $f$, and the perimeter of the wheel $a$ being known and the quantity of seed material or manure taken from the hoppers $g$ by the mortises 3 3 at each rotation of the roller $f$ being known, the quantity of seed or manure deposited in any given length the machine travels may be very closely ascertained, and the length of the roller being known, the quantity of seed or manure deposited per acre will be given, and this quantity may be increased or diminished as desired by increasing or lessening the contents of the mortises 3 3 by boxes or cups, as before stated, so as to give a very close approximation to any given quantity of seed or manure per acre, and the scattering-roller $n$ below, going at a much greater speed than the feed-roller $f$, receives the contents of the mortises 3 3 on its surface and among and upon the pins 6 6 6 6 in such a manner as to strike and scatter the seed effectively and equally over the ground to be sown.

We believe that small grain will require an increased proportionate difference of speed between the rollers $f$ and $n$; but as a general rule the scattering-roller $n$ may be geared to go twelve revolutions for one of the feeding-roller $f$ with considerable advantage. The proportion of the parts to produce these results is not stated herein, as it depends upon mere calculation grounded on the size of the machine, all of which every mechanic can make to suit himself.

We do not claim to have invented any of the parts above described, each taken separately being well known; but We do claim as new and of our own invention and desire to secure by Letters Patent of the United States—

The application of mortises and boxes or cups 3 3 in the feeding-roller $f$ to measure off any proportionate quantity of seed or manure for deposit in any given surface of ground, in combination with the scattering-roller $n$, fitted with pins or beaters 6 6 6 6, when such application and combination are employed for the purpose herein set forth, and constructed and operating substantially as herein described and shown.

In witness whereof we have hereunto set our hands, in Fairfield above named, this 29th day of September, 1845.

WILLIAM JMS. JONES. [L. S.]
    HENRY C. SMITH. [L. S.]

Witnesses:
    THOMAS B. OSBORNE,
    ELIZABETH H. OSBORNE.